US00RE40276E

(19) United States
(12) Reissued Patent
Hunter et al.

(10) Patent Number: US RE40,276 E
(45) Date of Reissued Patent: Apr. 29, 2008

(54) BIOLOGICAL SAFETY CABINET WITH IMPROVED AIR FLOW

(75) Inventors: Jim Hunter, Overland Park, KS (US); Kevin Gilkison, Overland Park, KS (US); Larry Nelson, Kingsville, MO (US); Burt Rhea, Overland Park, KS (US); Jerry O'Dell, Independence, MO (US); Greg Krueger, Trimble, MO (US); Gary Roepke, Kansas City, MO (US); Gerhard W. Knutson, Edina, MN (US); Mary Ellen Kennedy, Ashton (CA)

(73) Assignee: Labconco Corporation, Kansas City, MO (US)

(21) Appl. No.: 10/800,357

(22) Filed: Mar. 15, 2004

Related U.S. Patent Documents

Reissue of:
(64) Patent No.: 6,368,206
Issued: Apr. 9, 2002
Appl. No.: 09/553,923
Filed: Apr. 20, 2000

(51) Int. Cl.
*B08B 15/02* (2006.01)

(52) U.S. Cl. ..... 454/58; 454/57; 312/209
(58) Field of Classification Search ..... 454/56, 454/57, 58; 312/209
See application file for complete search history.

(56) References Cited

U.S. PATENT DOCUMENTS 3,011,425 A * 12/1961 Grushoff ..... 454/57
3,254,588 A * 6/1966 Truhan ..... 454/58
3,318,076 A * 5/1967 Baker ..... 454/56 X
3,415,180 A * 12/1968 Arhex et al. ..... 454/58
3,811,250 A * 5/1974 Fowler, Jr. ..... 454/56 X
3,895,570 A * 7/1975 Eagleson, Jr. ..... 454/57
4,548,627 A 10/1985 Landy
5,050,943 A * 9/1991 Barnett
5,295,902 A * 3/1994 Hock
5,380,244 A * 1/1995 Tipton ..... 454/57
6,036,737 A * 3/2000 Smith et al. ..... 454/58 X

FOREIGN PATENT DOCUMENTS

EP 0 486 971 A * 5/1992 ..... 454/56

* cited by examiner

*Primary Examiner*—Gregory A. Wilson
(74) *Attorney, Agent, or Firm*—Stinson Morrison Hecker LLP; J. David Wharton

(57) ABSTRACT

A biological safety cabinet is provided that includes a frame. The frame defines a protected work area and encloses the work area on all but one side. A sash is coupled to the frame that at least partially encloses the side that is not enclosed by the frame. A blower is coupled to the frame generally above the work area. The blower is adapted to circulate air through the work area to make the work area a negative pressure area so that harmful materials are confined. A sash grill is coupled to the frame generally below the sash that has a curved top surface. The curved sash grill provides a superior and less turbulent air-flow into the work area, thereby better containing any harmful materials. The curved sash grill is perforated, and the curvature and perforations of the sash grill compensate for partial blockage by such things as the user's arms and other objects. The curvature of the sash grill also avoids a sharp angle at the same height as the work surface which reduces the chance of contact and possible breakage of labware as it is moved into the cabinet.

26 Claims, 5 Drawing Sheets

4.
126
124
128
36
40
122
34
26
30
165
28
33
160
66
68
32
10.
43
4.
44
42
20
62
70
74
72
156
158
18
7.
8.
7.
24
22
60
58
78
46
46
14
8.

Fig. 4.
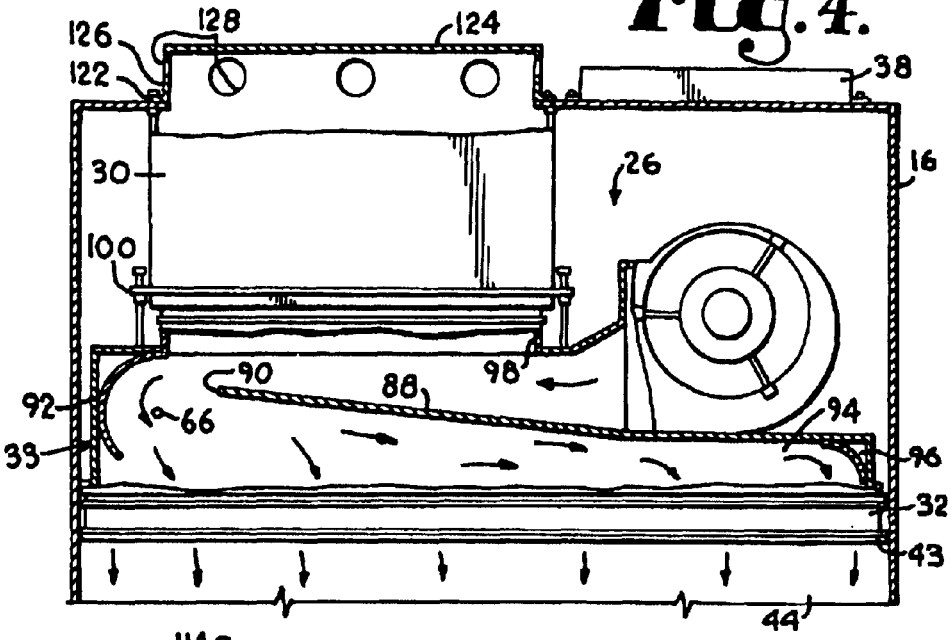
Fig. 5.
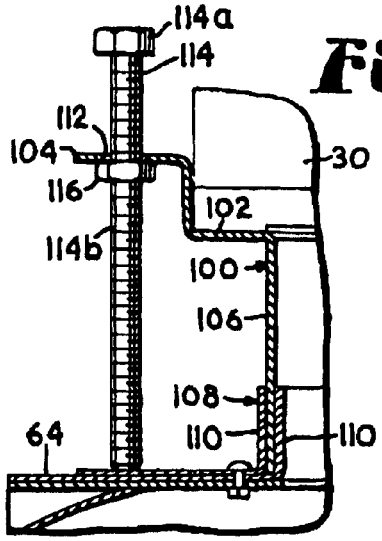
Fig. 6.
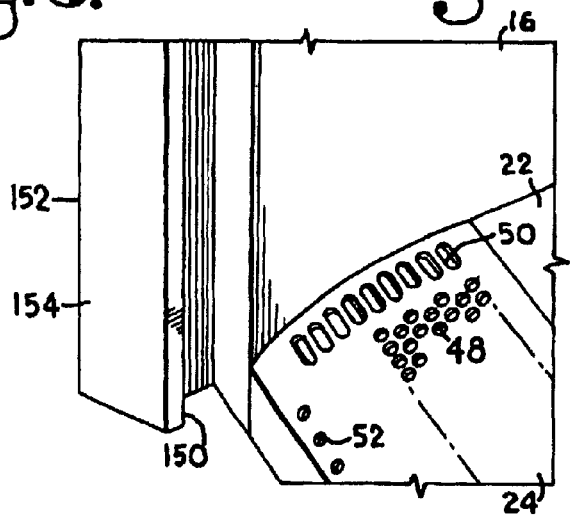
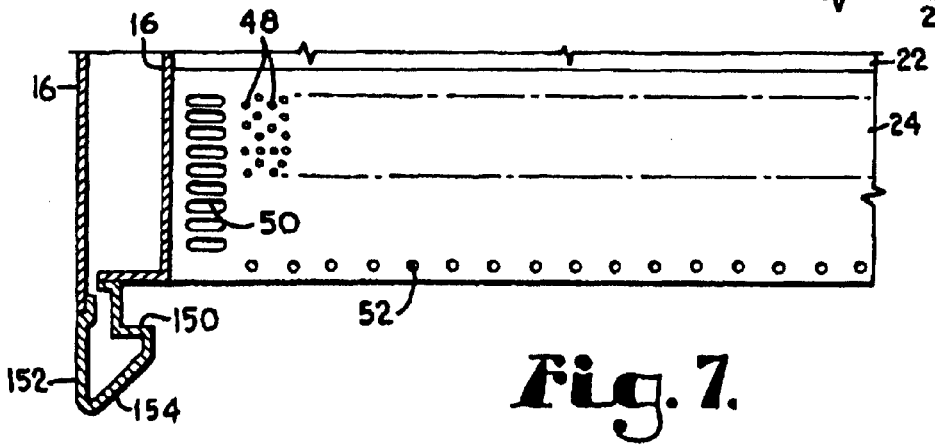
Fig. 7.

BIOLOGICAL SAFETY CABINET WITH IMPROVED AIR FLOW

Matter enclosed in heavy brackets [ ] appears in the original patent but forms no part of this reissue specification; matter printed in italics indicates the additions made by reissue.

BACKGROUND OF THE INVENTION

The present invention relates generally to biological safety cabinets.

Biological safety cabinets are laboratory containment devices equipped with High Energy Particulate Air (HEPA) filters. These cabinets are used in microbiological laboratories and provide a work area with safe environment in which a variety of experiments and studies can be performed. Rather than providing only a hood above a working surface, these cabinets provide a more protective working environment. The safety cabinet has a frame that surrounds the work area on all but one side. The remaining open side is enclosed by a moveable sash. The sash may be moved upwardly to provide access to the work area, so that work can be performed. The sash may be moved downwardly to partially or completely close the work area. A blower unit is provided in the cabinet above the work area. The blower is used to circulate air downwardly through the safety cabinet. A portion of this downward air flow forms an air curtain at the front of the cabinet work area and passes beneath the floor of the work area and a portion is directed to the back of the cabinet where it is drawn upwardly through a plenum chamber. This air may be contaminated by materials being used within the working environment. Therefore, prior to being exhausted into the room or a fume system, the air is first passed through a HEPA exhaust filter.

The blower is operated so there is sufficient air flow through the work area to insure that any harmful materials are contained and eventually passed to a filter area rather than escaping into the room or exhausted into the atmosphere. To this end some air is drawn into the safety cabinet about the open perimeter formed when the sash is in an open or partially open position.

The prior art safety cabinets are typically provided with a sash grill located below the bottom of the sash. This sash grill forms the lower-most surface of the opening into the work area. Typically, the sash grill is provided with a number of perforations, through which air can flow. Air flows downwardly from the blower along the back of the sash and into these perforations. Air is also drawn inwardly from the exterior of the cabinet along the surface of the sash grill and into the perforations. The air flowing through the sash grill flows under the work surface and upwardly through the plenum at the back of the cabinet to be recirculated or exhausted.

Safety cabinets have heretofore utilized a sash grill having a generally flat surface which gives rise to a number of disadvantages. The flat surface may be used by those operating the safety cabinet as a surface on which to place a variety of labware. This is undesirable because objects located on the sash grill present a source of possible contamination of the room, and may be inadvertently broken if bumped or knocked onto the floor. Moreover, by placing an object on the sash grill, a portion of the perforations therein may be blocked, which can adversely affect the air flow of the safety cabinet. The flat surface of the sash grill also results in a large portion of the perforations therein becoming blocked by a user's arm as the user performs work within the safety cabinet. As the user's arm blocks the perforations in this fashion, it is difficult to properly maintain the negative pressure environment about the user's arm, thereby risking possible contamination. The flat sash grills of the prior art also present a right angle with the work surface which projects far enough above the work surface that labware is sometimes broken when it bumps against the projecting vertical face. It is thus desirable to provide a sash grill which does not provide a flat surface and does not present a right angle corner at the entrance to the work area opening.

Another drawback of prior art sash grills is attributable to the fact that the grills are formed with a front face that is at a right angle to the flat top of the grill. This orthogonal relationship results in an air flow that is less than desirable. When air is drawn inwardly and through the perforations in the sash foil, it may cause a turbulence in the air flowing downwardly along the back of the sash and through the working environment. This turbulence is increased by the right angle relationship, as the air encountering the front face of the grill will be partially directed upwardly over the front face before being drawn through the perforations in the flat top of the grill. Therefore, a biological safety cabinet is needed with a sash grill that improves the air flow and safety of the cabinet.

Similarly, air may be drawn into the opening of the safety cabinet along the sides of the cabinet adjacent the opening when the sash is in an open or partially open position. In prior art safety cabinets, the front sides of the cabinet are oriented at right angles relative to the interior side walls. When air is drawn into the cabinet along these sides, it will initially be directed away from the interior surface of the interior walls. However, it is much more desirable to cleanly "sweep" the interior walls of the cabinet, to ensure the best possible containment of any harmful materials. A biological safety cabinet having a construction that draws air inwardly to cleanly sweep the interior side walls is needed.

After the safety cabinets have been used for a certain period of time, they must be decontaminated. One method for performing this decontamination involves sealing the front of the safety cabinet with a plastic sheet. When the prior art safety cabinets are being decontaminated, it is often necessary to first remove the sash to insure proper decontamination. This is attributable to the location of the sash within a U-shaped channel where contaminants may accumulate. This procedure is time consuming and risks damage to the sash. If the sash is dropped it may shatter, and contaminate an entire room. Thus, a biological safety cabinet which can be decontaminated without removal of the sash is needed.

Another drawback of prior art safety cabinets involves the lower edge or handle of the moveable sash. When the sash is in an open or partially open position, two bodies of air are coming together adjacent the handle of the sash. One body of air is flowing from the exterior of the cabinet into the interior thereof. The second body of air is flowing downwardly from the blower unit of the safety cabinet along the back of the sash. In prior art cabinets, the sash handle has transitioned from the front face to the bottom face at a right angle. This results in the inwardly flowing air meeting the downwardly flowing air at a right angle, causing turbulence. As noted above, turbulent air flow adjacent the opening of the cabinet is undesirable. A sash handle that reduces turbulence would represent an improvement over the prior art.

As stated above, the biological safety cabinet is operated with the benefit of a blower which provides an air flow so that harmful materials are contained within the cabinet. The cabinets are constructed with the blower above the working environment, and the working environment is subject to a continual flow of air to contain contaminants and then move them to a filter area. Above the working environment and beneath the blower, is a supply filter and a positive pressure plenum. The pressure plenum receives air from the blower and directs it through the supply filter.

To monitor the pressure within the cabinet, prior art safety units have used a pressure gauge mounted on the exterior of the cabinet, with the pressure being monitored in the positive pressure environment of the pressure plenum immediately below the blower. Monitoring the positive pressure allows a more meaningful pressure reading to be obtained and used by the laboratory personnel. However, the air within the pressure plenum immediately below the blower has not yet been filtered. As such, the air may contain harmful materials from the working environment below. If the gauge on the exterior of the cabinet were to leak, contaminated air would be allowed into the room. In some instances this concern has been addressed by placing a HEPA filter in the pressure line to the readout gauge. This of course results in additional expense both initially and for ongoing maintenance. Another method of addressing the potential problem of contamination through the pressure gauge has been to monitor the air pressure in a negative pressure environment (relative to the atmosphere surrounding the cabinet) thus eliminating the possibility of contamination as a result of leakage through the gauge into the room. Monitoring and displaying a negative pressure, however, is more difficult to translate into meaningful and usable numbers by laboratory personnel. A monitoring apparatus is therefore needed which does not require any additional filters and allows the monitoring and display of a positive pressure, while eliminating the risk of possible contamination of the room environment.

It has been found that it is desirable to equip the safety cabinet with a "towel catch" to catch or filter out large objects from the returning air flow prior to being recirculated through the blower. This towel catch removes such things as paper towels and small laboratory items from the returning air stream. Prior art safety cabinets have located this towel catch in the plenum formed by the rear wall of the work area and the rear wall of the safety cabinet. While this location is effective in removal of the desired items, it is impossible to visually inspect without taking the cabinet apart. One method typically utilized for inspecting these prior art towel catchers is to reach up within the plenum and feel the towel catch to determine if any paper towels or other objects are lodged within or against the towel catcher. This method can be uncomfortable and dangerous to the extent that pieces of broken laboratory glass and other sharp objects may be lodged within the towel catch. The towel catch itself is normally formed from metal with sharp edges which presents a safety hazard in and of itself if it is placed in a traditional location where it is not visible to a worker cleaning it. Therefore, a towel catch that is readily accessible and can be visually inspected is needed.

Another drawback of prior art safety cabinets involves the construction of the sash. The sash of the safety cabinet is moveable upwardly and downwardly, to allow better access to the working environment when needed and to more fully enclose the working environment when access is no longer needed. In prior art safety cabinets, the rear of the sash is provided with a seal to prevent any contaminated air from escaping the working environment. The seal wipes the back of the sash as the sash is raised. This arrangement is disadvantageous in that the wiping action may create an aerosol containing contaminants from the rear of the sash. While in other prior art constructions holes communicating with the exhaust system have been utilized in place of seals, such constructions have not been particularly effective, largely because there has been no means for insuring a uniform negative pressure across the exhaust holes. Thus, an arrangement is needed for a biological safety cabinet that eliminates the need for a wiping seal at the rear of the sash and instead provides for a uniform negative pressure which will insure removal of any contaminated air from the back side of the sash.

Yet another drawback of existing prior art safety cabinets involves the design of the positive pressure plenum box. This box is located in the area below the blower and above the work area. More specifically, in prior art cabinets, air leaving the blower is directed to a perforated plate and then through a supply filter prior to be recirculated downwardly through the work area. The perforated plate is used to more evenly distribute the air flow over and through the supply filter. The perforated plate creates an undesirable increased load on the blower and can interfere with the function of the supply filter. Moreover, this prior art construction does not distribute air across the supply filter as evenly as desired. Therefore, a structure is needed that both evenly distributes the flow over and across the supply filter while not overly increasing the load on the blower or interfering with the function of the supply filter.

Prior art safety cabinets are typically equipped with exhaust control systems. As contaminated air passes through the blower of the safety cabinet, some of the air is recirculated through the supply filter as described above and some of the air is routed through an exhaust filter. This exhaust air is either discharged into the room, or it passed to an exhaust system associated with the safety cabinet which moves the air out of the building. In cabinets routing the exhaust air directly back into the room, the prior art cabinets have merely routed the air directly upwardly. Prior art units routing the air into a building exhaust system direct typically employ duct work coupling the safety cabinet exhaust to the building exhaust system. Both prior art embodiments require a certain amount of additional space above the ceiling of the safety cabinet to allow for the exhaust control systems. This need for space can place limitations on the rooms in which the safety cabinets can be used.

In addition to routing the exhaust air, the exhaust control systems of the safety cabinets are used to balance the air flow through the safety cabinet. Prior art exhaust control systems use a guillotine damper to allow more or less air to be exhausted, as needed to balance the air flow through the safety cabinet and achieve the proper pressure within the cabinet. This damper places some additional load on the blower by restricting air flow to the filter. Furthermore, a damper is not aerodynamically efficient and interferes with the uniform flow of air. Such dampers are normally not readily accessible for making adjustments. The use of such a damper also tends to cause air to flow unevenly through the filter thus not effectively using the entire filter surface area. Therefore, a more efficient exhaust control system is needed for a biological safety cabinet that reduces undesired blower loading, makes better utilization of available filter surface area and is readily accessible.

BRIEF SUMMARY OF THE INVENTION

It is an object of the present invention to provide a biological safety cabinet having a novel sash grill that more effectively prevents contaminated air from leaving the cabinet, and more effectively draws air into the cabinet.

It is another object of this invention to provide a sash grill for a biological safety cabinet that prevents objects from being placed thereon.

It is a further object of the invention to provide a biological safety cabinet having exterior front side panels that allow incoming air to more effectively sweep the sides of the cabinet and that allow the cabinet to more easily be decontaminated.

It is yet another object of the invention to provide a handle for the sash of a biological safety cabinet that allows air to more effectively flow thereover.

It is still another object of the present invention to provide a biological safety cabinet in which the pressure gauge measures a positive pressure environment while being contained within the safety cabinet so that any risk of contamination through the gauge is reduced while also eliminating the need for a separate HEPA filter for the gauge.

Another object of the present invention is to provide a towel catch for a biological safety cabinet that is visible to the user thereof and that can be easily removed without disassembling the safety cabinet.

Yet another object of the present invention is to provide a biological safety cabinet that eliminates the need to wipe the back of the sash with a seal so that still another risk of contamination is reduced.

It is another object of the present invention to provide a biological safety cabinet with a plenum box that evenly distributes the air flow across a supply filter without increasing the load on the blower of the cabinet.

A still further object of the present invention is to provide a biological safety cabinet with a low profile, externally adjustable exhaust control that does not require decontamination before adjusting and provides for more uniform distribution of air across the exhaust filter.

It is yet another object of the present invention to provide a plenum chamber seal and tensioning device for the exhaust filter of a biological safety cabinet that allows the supply filter and exhaust filter to be simultaneously sealed.

According to the present invention, the foregoing and other objects are attained by a biological safety cabinet that includes a frame that defines a protected working environment and encloses the working environment on all but one side. A sash is coupled to the frame that at least partially encloses the side that is not enclosed by the frame. A blower is coupled to the frame generally above the working environment. The blower is adapted to circulate air through the working area so that harmful materials are confined. A sash grill is coupled to the frame generally below the sash and has a curved top surface. The curved sash grill provides a superior and less turbulent air-flow into the working environment, thereby better containing any harmful materials. The curved sash grill is perforated, and the curvature and perforations of the sash grill compensate for partial blockage by the user's arms and other objects. The curvature of the sash grill also presents a surface on which objects cannot be easily placed, thereby avoiding a safety hazard. The curved grill also eliminates a protruding right angle corner at the cabinet opening which has been known to cause breakage of labware being placed inside the cabinet.

Additional objects, advantages, and novel features of the invention will be set forth in part in the description which follows, and in part will be apparent to those skilled in the art upon examination of the following, or may be learned from practice of the invention.

BRIEF DESCRIPTION OF THE DRAWINGS

In the accompanying drawings which form a part of this specification and which are to be read in conjunction therewith and in which like reference numerals are used to indicate like parts in the various views:

FIG. 4 is a partial cross sectional view taken along line 4-4 of FIG. 3;

FIG. 5 is an enlarged view of the encircling line 5 of FIG. 2, showing the sealing arrangement between the supply filter and the exhaust filter;

FIG. 6 is an enlarged view of the encircling line 6 of FIG. 1;

FIG. 7 is a partial sectional view taken along line 7-7 of FIG. 3 showing a partial top plan view of the sash grill used in the safety cabinet of FIG. 1;

DETAILED DESCRIPTION OF THE INVENTION

Figure 1:
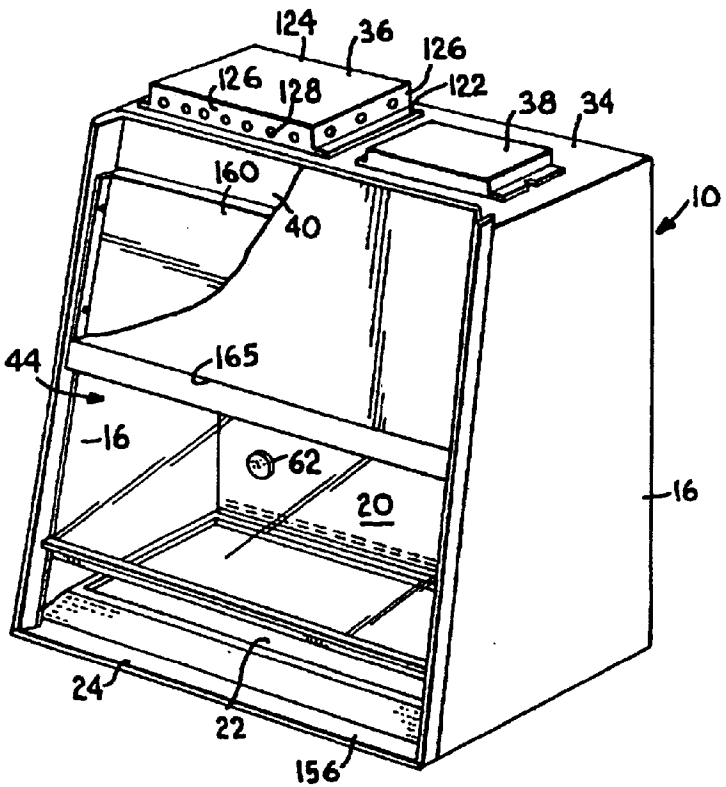
FIG. 1 is a perspective view of the biological safety cabinet of the present invention, with parts being broken away to show particular details of construction.
Figure 3:
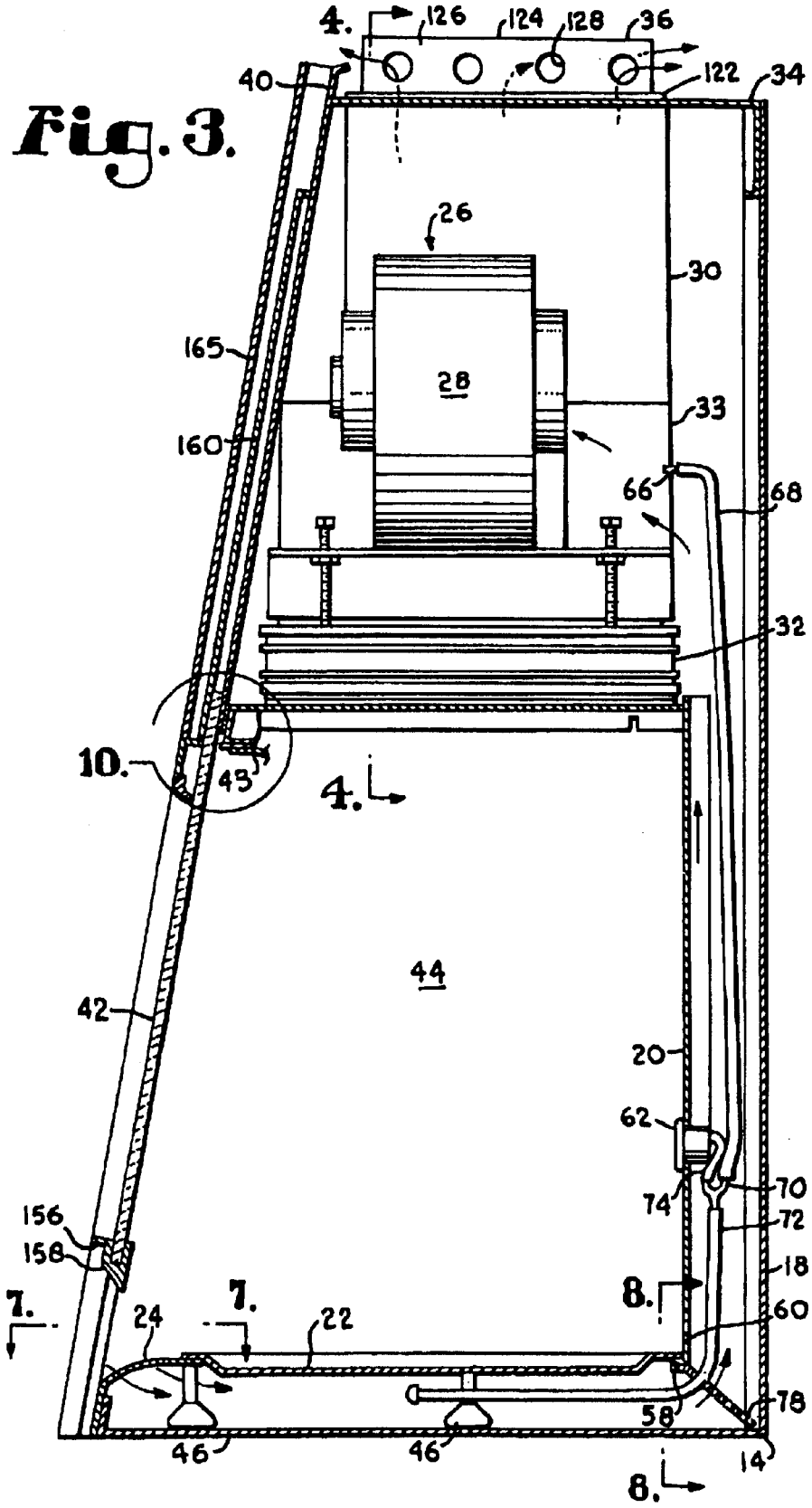
FIG. 3 is a side cross sectional view taken along line 3-3 of FIG. 2.

Referring initially to FIG. 1, a biological safety cabinet according to the present invention is broadly designated in the drawings by the reference numeral 10. A broad overview of the construction of cabinet 10 is set forth below, followed by a more detailed description of certain features of the cabinet. Broadly, cabinet 10 has a bottom panel 14 and a pair of upwardly extending opposing side panels 16 which are rigidly coupled to bottom panel 14, such as by welding. Extending upwardly from the bottom panel 14 and rigidly coupled between side panels 16 is a rear panel 18, as best seen in FIG. 3. Rear panel 18 extends upwardly from bottom panel 14 as do side panels 16. Bottom panel 14, side panels 16 and rear panel 18 form apartial frame in which the other components of cabinet 10 are held. A baffle 20 is coupled between side panels 16 and is spaced outwardly away from real panel 18. The bottom of baffle 20 is spaced upwardly away from bottom panel 14. Panels 14, 16 and 18, as well as baffle 20 are preferably made from metal, such as stainless steel.

As best seen in FIG. 3, a work surface 22 is suspended above bottom panel 14. Work surface 22 is used to hold the objects necessary to perform experiments within cabinet 10, such as beakers, flasks and other conventional labware. Extending generally along the front of cabinet 10 between side panels 16, and extending from work surface 22 to bottom panel 14, is a sash grill 24, the importance of which is further described below.

Figure 2:
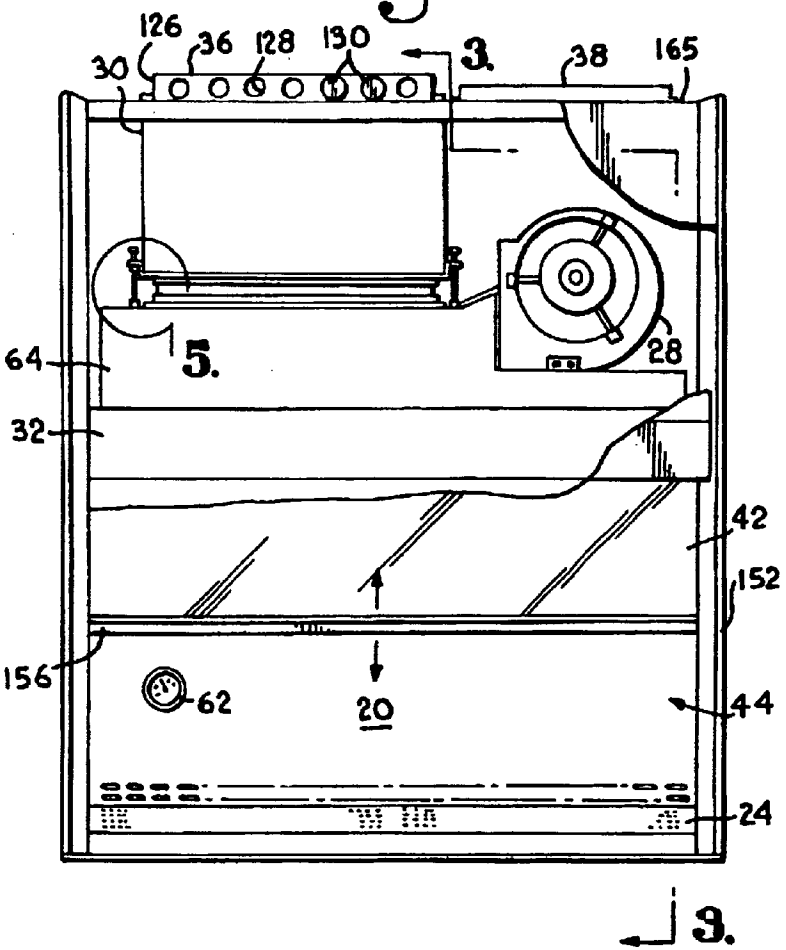
FIG. 2 is a front elevation view of the safety cabinet of FIG. 1, with parts being broken away to show particular details of construction.

As best seen in FIGS. 2-4, a blower assembly 26 is located in the upper part of cabinet 10. Assembly 26 includes a blower 28, an exhaust filter 30, a supply filter 32 and a plenum box 33 which is in communication with the blower outlet. A top panel 34 presents the enclosed top of the cabinet. Panel 34 extends from rear panel 18 to the front of the cabinet and between side panels 16. An exhaust control cap 36 is coupled to top panel 34 directly above exhaust filter 30. Top panel 34 also has coupled thereto an electronics housing 38. Housing 38 houses and protects the electronics necessary to operate cabinet 10. As best seen in FIGS. 1 and 3, a cover panel 40 that is coupled to top panel 34 and extends between side panels 16. Panel 40 extends only partially down cabinet 10 from top panel 34. A movable sash 42 is mounted between side panels 16 in a manner allowing it to be moved upwardly and downwardly. Work surface 22, baffle 20, side panels 16 and an air diffuser plate 43 below supply filter 32 form a protective work area 44 within which work can be performed.

In use, blower 28 of cabinet 10 is operated to provide an air-flow through the cabinet, and particularly through work area 44. Prior to the air entering the work area 44, it is first passed through supply filter 32 to remove any contaminants. Cabinet 10 may be operated with sash 42 located a specified distance away from sash grill 24, as is shown in FIG. 3. To ensure that contaminants do not escape through the opening between sash 42 and grill 24, blower 28 will direct air downwardly along the rear of sash 42 and into the perforations of grill 24 from above the work area to provide a protective curtain of air that facilitates containment within work area 44. A portion of the air from blower 28 also moves toward the rear of the surface 22 as will be explained hereinafter. The action of blower 28 provides a certain amount of suction, causing an air flow inwardly along the opening defined by the bottom of sash 42, side panels 16 and sash grill 24. Air which is drawn through this opening also passes through the perforations in sash grill 24. The air, once drawn through sash grill 24, will travel beneath work surface 22 and through the plenum defined by baffle 20 and real panel 18 as it is drawn upwardly by blower 28. The air moving from the blower to the rear of surface 22 will also be drawn into this same plenum.

Air that has passed through working environment 44 is likely to contain contaminants and thus, before being recirculated or exhausted to the room, is first passed through a HEPA filter. Prior to being recirculated into working environment 44 the air passes through supply filter 32. Similarly, prior to being exhausted to the room, the air is passed through exhaust filter 30. Filters 30 and 32 are both High Efficiency Particulate Air (HEPA) filters of a type well known to those skilled in the art. Thus, cabinet 10 is used to perform experiments within work area 44 and to contain any contaminated air within the cabinet. Particular and novel details of construction are more fully set out below.

As best seen in FIG. 3, work surface 22 is positioned above bottom panel 14 by a number of supports 46 that are preferably screwed directly into bottom panel 14 (additional support is provided by a rear lip to be described hereinafter). Supports 46 are thus easily removable and can be decontaminated and cleaned after removal from bottom panel 14 as needed. Work surface 22 rests directly upon supports 46 and is thus spaced from bottom panel 14. The spacing between bottom panel 14 and work surface 22 allows air to circulate beneath work surface 22. Surface 22 can be made from a material such as stainless steel and is placed on supports 46 so that the rear edge thereof rests on a lip at the bottom of baffle 20. Work surface 22 may be held in place through the use of removable fasteners which require no tools. Work surface 22 is thus mounted within safety cabinet 10 in a manner allowing the easy removal thereof, such as may be needed for decontamination and cleaning of the safety cabinet.

Sash grill 24 extends between the front of work surface 22 and bottom panel 14 from one side panel 16 to the other. As best seen in FIGS. 6 and 7, grill 24 has a plurality of main perforations in 48 therein. Perforations 48 allow air to flow through sash grill 24 as air passes downwardly along the rear of sash 42 and inwardly as air enters the safety cabinet adjacent the surface of sash grill 24. Preferably, perforations 48 extend generally from one side of sash grill 24 to the other. However, as best seen in FIGS. 6 and 7, a series of enlarged side holes 50 are provided along each side of grill 24. Enlarged holes 50 provide additional air flow adjacent side panels 16 and operate to better contain the air within working environment 44. Further, grill 24 is provided with a front row of scavenger holes 52. Scavenger holes 52 operate to provide an additional source of protection should the main perforations 48 become blocked along the length of sash grill 24.

As best seen in FIGS. 3 and 6, sash grill 24 has a curved surface. This curved surface provides a number of advantages. First, it prevents objects from being placed on the sash grill and blocking any of the perforations within sash grill 24. This not only prevents blockage of the perforations, but also eliminates any possibility of objects being placed on the grill and then knocked off and broken. The curved shape of the grill also eliminates a sharp edge at the same level as that of the work surface which greatly reduces the possibility of accidental contact when labware is being moved in and out of the work area. Contact at this point has been a source of breakage of glass labware in the past. Further, the curvature provided also prevents all of the main perforations 48 in a particular area from being blocked by a relatively linear object, such as a person's arm. Safety standards require a certain minimal opening for the sash while a user is performing a task in the work area with the sash raised. This means that there must be a certain minimal distance between the bottom of the sash and the top of the sash grill. With the curved grill of the present invention, since the height of the grill relative to the floor is lower than it would be if the grill was flat, the minimal distance between the bottom of the sash and the grill can be met with the sash lower relative to the floor than with prior flat grills. This results in the sash handle, which interferes with the view of the worker, being in a lower position and improves the worker's available viewing area. It also improves work safety by increasing the distance between the opening and the worker's face. The curved surface of grill 24 also operates to allow the air flowing downwardly along the back of sash 42, and the air flowing inwardly from the opening in cabinet 10, to more effectively sweep across the grill surface and enter the work area. In prior art systems, the air flowing inwardly is confronted with a front face that is located at a right angle to the flat horizontal surface of the sash foil. This air is then forced in an upward arc away from the surface of the sash grill prior to entering any perforations therein. With the novel curved sash grill of the present invention, the downwardly moving air is not confronted with a surface at a sharp (right) angle to the direction of air flow, which allows it to more effectively enter through the perforations within the sash grill with less turbulence. The curved surface of grill 24 also promotes smooth flow of air across the grill into the work area from outside the cabinet. Less turbulence is experienced then with prior art designs where the grill presents a right angle relative to the work surface.

Figure 8:
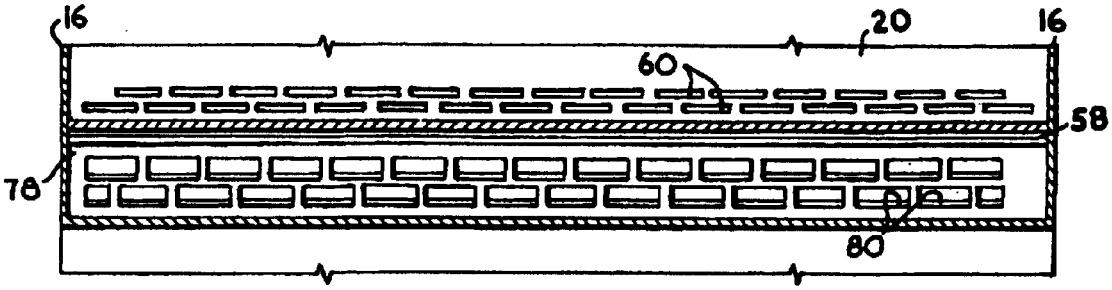
FIG. 8 is a partial sectional view taken along line 8-8 of FIG. 3, showing an elevation view of the towel catch used in the safety cabinet of FIG. 1.

Turning to the rear of cabinet 10, baffle 20 is mounted between side panels 16 and can be secured in place such as by bolting or welding. The lower-most edge of baffle 20 may be provided with a support lip 58 as best seen in FIG. 3. Lip 58 is used to support work surface 22 and may be provided with a number of threaded holes to secure work surface 22 to baffle 20. Located above the lower most surface of baffle 20 and extending from one side of baffle 20 to the other, are a number of slots 60, as best seen in FIG. 8. Slots 60 are provided to allow air flowing downwardly from blower 28 to pass there through and into the plenum formed by baffle 20 and rear panel 18.

As best seen in FIG. 3, a pressure gauge 62 is mounted within baffle 20 above slots 60. Gauge 62 can be viewed by the user of safety cabinet 10 through sash 42, which is made from a clear material such as tempered glass. Gauge 62 is used to measure a positive pressure within a plenum box 64 that is located immediately below blower 28. Measuring the positive pressure within plenum box 64 allows the user of cabinet 10 to obtain a more accurate indication of the load on filters 30 and 32. To measure the pressure within plenum box 64, a hose barb 66 is placed through the rear plate of plenum box 64. A piece of tubing 68 is mounted to hose barb 66 and extends downwardly through the rear plenum and is connected to a plastic Y-hose barb 70. Another piece of tubing 72 extends from the lower end of barb 70 downwardly and into the space between bottom panel 14 and work surface 22. Finally, the remaining end of hose barb 70 is connected to a third piece of tubing 74 which is coupled to the high pressure port of gauge 62. Gauge 62 thus is mounted entirely within safety cabinet 10 and is adapted to measure the positive pressure within plenum box 64. Should any leakage occur within gauge 62, any contaminants within tubing 68, 72 or 74 would be contained within cabinet 10 and would be filtered prior to being exhausted into the room.

As best seen in FIGS. 3 and 8, cabinet, 10 is also provided with a perforated towel catch 78. More specifically, a towel catch 78 extends from lip 58 at the bottom of baffle 20 downwardly to bottom panel 14. Preferably, catch 78 is angled rearwardly as shown in FIG. 3, and is mounted to baffle 20 with the same screws that are used to attach work surface 22 to baffle 20. This mounting allows towel catch 78 to easily be removed, such as may be necessary to clean towel catch 78 or bottom panel 14 in the event of a spill. As best seen in FIG. 8, catch 78 has a number of rectangular slots 80 which allow air to pass through catch 78 and upwardly behind baffle 20. Moreover, the lower tubing 72 associated with pressure gauge 62 may be passed through one of the slots 80. Catch 78 is used to prevent objects such as broken pieces of glass and paper towels from traveling upwardly through the rear plenum and into blower 28. In use, work surface 22 may be pulled away from baffle 20 which allows towel catch 78 to be visually inspected for any blockage. If an object is lodged against towel catch 78, it may be easily removed by the user of safety cabinet 10. Moreover, the visual inspection allows the user of safety cabinet 10 to avoid contact with the catch which might result in injury and to be forewarned if a sharp of dangerous object is lodged against the catch. Prior art safety cabinets have located the towel catch associated therewith upwardly from the bottom of the safety cabinet. Generally, such a prior art towel catch would be located somewhere above the rear intake of the exhaust plenum 20. In such a location the towel catch becomes a safety hazard in and of itself and can also result in injury if sharp objects are restrained by it. Location of towel catch 78 as described for the present invention allows the towel catch 78 to be visually inspected and cleaned. Further, the towel catch may be much more easily removed from safety cabinet 10 if needed, such as when surface 22 is to be removed for cleaning beneath it.

Turning to details of the plenum box 33 and associated filters, and as best seen in FIGS. 3 and 4, the supply filter 32 is located above work area 44 at the upper end of the baffle 20. Air diffuser 43 is located immediately below supply filter 32. Diffuser 43 operates to properly direct the air as it exits supply filter 32 to obtain the desired air flow through work area 44. Immediately above supply filter 32 is the plenum box 33. Box 33 directly abuts supply filter 32 and is held against it as described below. As best seen in FIG. 4, plenum box 33 extends from the exit of blower 28 and provides a structure for evenly distributing the air flow to both the supply and exhaust filters. More specifically, box 64 includes a distribution baffle 88 that tapers upwardly from the exit of blower 28 as it extends across the side of safety cabinet 10. Preferably, baffle 88 extends from the front of plenum box 64 to the back thereof. A portion of the output from blower 28 will pass upwardly to exhaust filter 30 while a portion will be directed into a narrow channel 90. The air leaving channel 90 is directed to a first curved deflector 92, as shown on the left-hand side of FIG. 4. Deflector 92 operates to redirect the air downwardly and to the right as viewed in FIG. 4. Deflector 92 is preferably made from a rigid material such as steel and is rigidly mounted within plenum box 33, such as by welding. As the air travels back to the right as viewed in FIG. 4, distribution baffle 88 forces the air downwardly and into a second narrow channel 94. The angle of baffle 88 is selected to insure that the volume of air passing across supply filter 32 is relatively constant across the entire width of the filter. The angle will vary depending upon the output of the blower and the size of filter 32. The air at the far right hand portion of plenum box 64, as viewed in FIG. 4, is directed downwardly by a second deflector 96. Thus, construction of plenum box 64, with baffle 88 and deflectors 92 and 96, operates to evenly distribute the air flow across and through supply filter 32. This is done without restricting the air flow, such as with the use of a prior art perforated plate. Therefore, the above construction of plenum box 64 achieves a more uniform distribution of air across supply filter 32 without placing an increased load on blower 28.

As best seen in FIG. 4, the upper end of plenum box 64 has an exhaust channel 98 therein that communicates directly with exhaust filter 30. Baffle 88 directs some of the air leaving blower 28 upwardly through exhaust channel 98 and exhaust filter 30 ultimately exiting cabinet 10 through exhaust control cap 36. As best seen in FIG. 5, exhaust filter 30 is held in position with an exhaust frame 100. Frame 100 includes a recessed portion 102 which is shaped to conform to the outer perimeter of exhaust filter 30. Portion 102 thus operates as a placement guide when filter 30 is to be replaced. Frame 100 also includes an upper bracket 104 and a lower leg 106, which extends downwardly into a labyrinth seal 108. As shown in FIG. 5, seal 108 includes a pair of upwardly extending plates 110 which are bolted to the top of plenum box 64. Leg 106 extends between the plates 110 and is movable there between.

To adjust the position of filter 30, the upper bracket 104 includes a pair of threaded holes 112, through which are placed a plurality of bolts 114. A retaining nut 116 is rigid with bracket 104 and in alignment with each bolt 114. Each bolt 114 has a head 114a, a threaded portion 114b and a length such that it extends to the upper surface of plenum box 64, and as shown in FIG. 5, may extend to the upper surface of a horizontal portion of plates 110 of the labyrinth seal 108. Exhaust frame 100 cooperates with bolts 114, the top of plenum box 64 and labyrinth seal 108 to simultaneously position and seal exhaust filter 30 upwardly and supply filter 32 downwardly. More specifically, in use, both head 114a is turned with a wrench to move portion 102 upwardly or downwardly along threaded portion 114b. When portion 102 is lowered, lower leg 106 will move lower within labyrinth seal 108. Thereafter, the exhaust filter 30 may be replaced by placing a new or clean exhaust filter 30 within recessed portion 102. Exhaust filter 30 is then raised into place by turning bolt 114 in the opposite direction. Bolt 114 may be rotated sufficiently to place a downward force on plenum box 64. This downward force on plenum box 64 forces exhaust filter 30 into a sealing engagement with top panel 34. Thus, bolt 114 in cooperation with portion 102 and nut 116 serves as a jack screw to raise and lower the filter housing and apply pressure in opposite vertical directions to hold the filter firmly in place.

Any air that is not recirculated through supply filter 32 and work area 44 must be filtered and exhausted from the cabinets. If air is to be exhausted into the room, exhaust control cap 36 is used. As best seen in FIGS. 1 through 3, exhaust control cap 36 is mounted on top of top panel 34 and directly above exhaust filter 30. Control cap 36 is generally rectangularly shaped and has a pair of mounting flanges 122 extending from each side thereof. Flanges 122 are used to mount control cap 36 to top panel 34. Control cap 36 has a solid top 124 and sides 126 which have a plurality of exhaust apertures 128 extending there through. Apertures 128 are preferably varied in diameter and operate to accommodate outward flow of exhaust air in a lateral as opposed to a vertical direction. As can be seen, control cap 36 thus provides a low profile mechanism for directing the exhaust air from safety cabinet 10 in a horizontal direction. As seen in FIG. 2, removable plugs 130 may be used to block the apertures 128. The number and size of the blocked apertures, in combination with the blower output, determines the volume of air that is exhausted through the control cap. The control cap 36 can therefore be used to regulate the flow of air being exhausted from safety cabinet 10. This regulation is done while evenly distributing the flow of exhaust air over the entire surface exhaust filter 30 and without placing an increased load on blower 28 by significantly restricting the passage of air.

Figure 9:
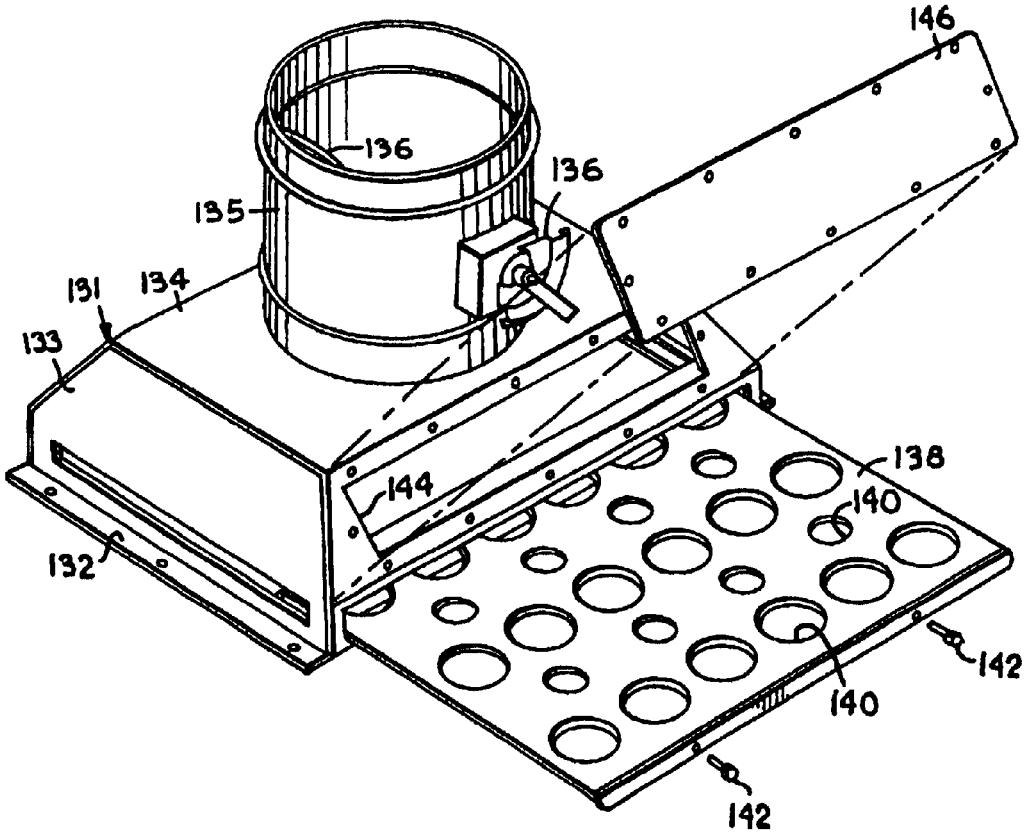
FIG. 9 is perspective view of an alternate embodiment of the exhaust body used in the safety cabinet of FIG. 1.

The above described embodiment of control cap 36 is utilized when the exhaust air from safety cabinet 10 is exhausted directly into the room. In an alternative embodiment, the air is not exhausted directly into the room, but rather is directed into an exhaust system that removes the air from the building. In this embodiment, a different exhaust control cap 131 used, and is shown in FIG. 9. As shown, control cap 131 has mounting flanges 132 that secured to top panel 34. In this embodiment, rather than the side surfaces 133 being provided with apertures 128, the side surfaces 133 are solid. In this embodiment however, a top surface 134 is provided with an exhaust duct 135. Preferably, duct 135 is cylindrical. Duct 135 may be provided with a damper 136 as is known to those of skill in the art. An apertured plate 138 mounted below duct 135 and above the exhaust filter 30 provides a mechanism for controlling the flow of air through the exhaust filter in much the same manner as control cap 36 described above. As shown in FIG. 9, the apertures 140 within plate 138 can be varied in size. Further, selected apertures 140 may be plugged to regulate the volume of air passing through plate 138. Plate 138 is preferably attached to control cap 131 with screws 142. Control cap 131 preferably includes an access port 144 along one side thereof, which is covered with a plate 146 in normal use. Plate 146 may be bolted or screwed to control cap 131. Port 144 is used to visually inspect plate 138 and obtain access thereto without removing plate 138. In use, the desired number of apertures 140 are plugged within plate 138 to regulate the amount of air flowing through cap 131. Plate 138 is then secured within control cap 131. Thereafter, the exhaust system associated with safety cabinet 10 is coupled to duct 135 so that air passing through exhaust filter 30 would be directed through control cap 131 and into the exhaust system. In the case of both cap 36 and plate 138 the fact that the mechanical device for controlling air flow is located on the "clean" side (i.e the downstream side) of the exhaust filter means that it can be accessed for adjustment or service without danger of contamination to either the worker or the room environment.

The front of cabinet 10 also has a novel construction. As best seen in FIG. 3, front panel 40 is coupled to top panel 34 and extends between side panels 16 to enclose the area above supply filter 32. Front panel may be held in place with any suitable attachment mechanism, such as by bolting. Sash 42 is held within cabinet 10 and travels along a pair of sash tracks 150, as best seen in FIG. 7. Tracks 150 are defined by a pair of front trim panels 152. As best seen in FIGS. 2 and 7, trim panels 152 have a wide and angled front face 154. Face 154 thus forms an acute angle with its associated side panel 16. The angle of face 154 directs air downwardly toward the sash opening and then inwardly to the interior side surfaces of work area 44. The angle of face 154 thus allows the air entering work area 44 to sweep the interior side surfaces of the work area as it passes over grill 24.

As best seen in FIG. 3, the lower-most edge of sash 42 is provided with a handle 156. Handle 156 is used to raise and lower sash 42 as may be needed to gain access to work area 44. As seen in FIG. 3, handle 156 is equipped with a curved or angled lower surface 158. While surface 158 is shown as being flat, but angled, it should also be understood that surface 158 could be curved in a concave shape. In use, surface 158 provides for a smooth interface of two bodies of air. The first body of air is that which is entering the cabinet from the outside through the sash opening. This air will travel along surface 158 as it approaches the sash opening. The second body of air is that which is moving downwardly along the back side of the sash inside the cabinet as a result of blower 28. By providing an angled or curved surface 158, the two bodies of air will not be meeting at a right angle, resulting in less turbulence and better containment of the air within work area 44. A third body of air is that which flows from the blower toward the rear of the work area.

Figure 10:
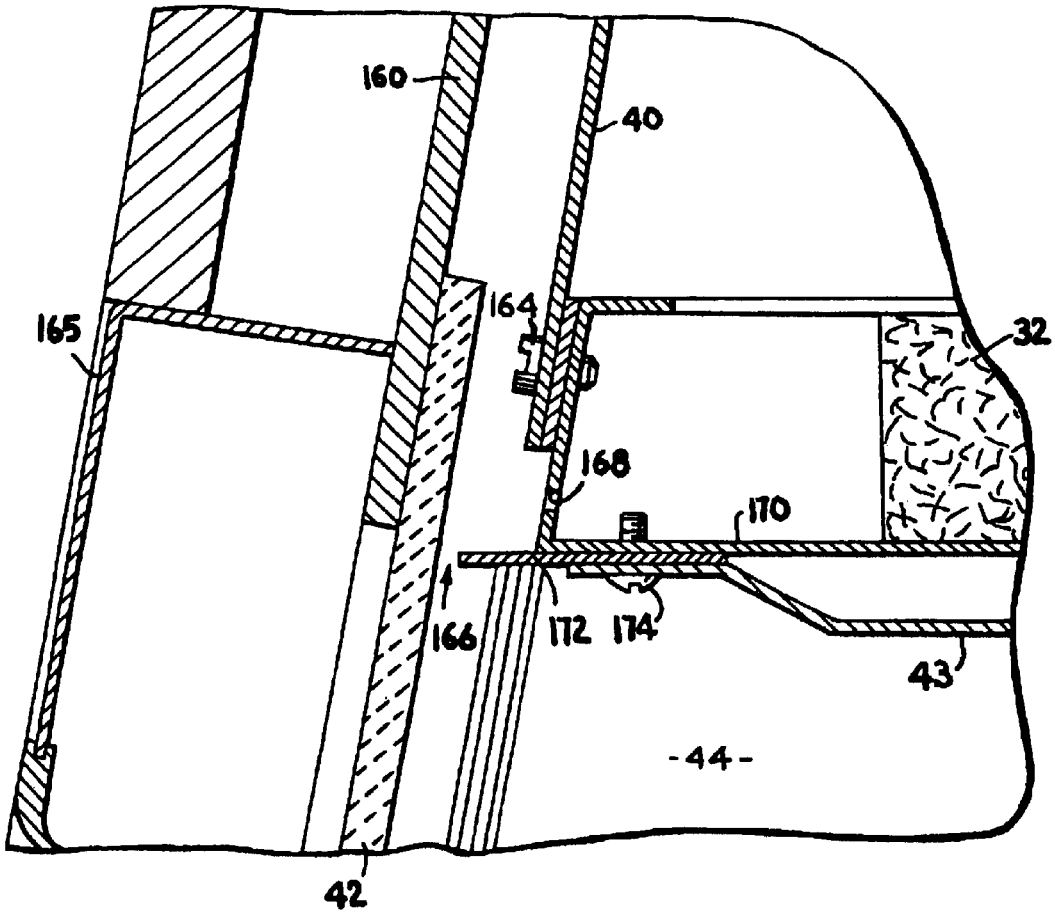
FIG. 10 is an enlarged view of the encircling line 10 of FIG. 3.

Referring to FIGS. 1, 3 and 10, as sash 42 is moved upwardly within tracks 150, it will slide behind an upper sash pocket 160. As best seen in FIGS. 1 and 3, sash pocket 160 is preferably bolted to front panel 40 and trim panels 152. Pocket 160 is shaped to extend from one side of sash 42 to the other, and is enclosed along the top thereof. Pocket 160 thus cooperates with front panel 40 to enclose the top and sides of sash 42 as it is moved upwardly along tracks 150. Pocket 160 acts to prevent the operator of cabinet 10 from accessing the upper portion of sash 42 as it slides away from work area 44. As best seen in FIG. 10, there is no physical contact between the rear of sash 42 and any type of seal. In the prior art, a wiping seal would exist in the area of a screw 133 shown in FIG. 10. This wiping seal resulted in certain disadvantages as explained above. Such a seal is not needed with the present invention. A front cover 165 is secured over the front of cabinet 10. More specifically, cover 165 is placed over sash pocket 160 and front panel 40 to present a more appealing front face for cabinet 10. The design of face 154 also facilitates decontamination of the cabinet as is required from time to time by safety regulations. Decontamination may occur by leaving pocket 160 in place and lowering the sash. The entire front of the cabinet is then sealed with plastic which is secured by tape to the angled surfaces 154. Alternatively, sash pocket 160 may be removed and the sash completely lowered followed by sealing off the front of the cabinet with plastic. Another alternative is to remove pocket 160 and place the sash in the fully raised position before the front face is sealed with plastic. In the latter two cases the pocket 160 may be placed inside the cabinet so that it will be decontaminated. In all three cases effective decontamination is accomplished without the need to actually remove the sash.

As can be seen in FIG. 10, there is no physical contact with the back of sash 42 and the prior art wiping seal has been eliminated. In order to insure that contaminated air from the work area 44 does not escape into the room a plurality of upper scavenger holes 168 are provided immediately above work area 44 along the front of cabinet 10. Any air leaving environment 44 will be drawn back through holes 168 and will not be leaked into the room. While the use of scavenger holes in this location has been taught by prior art constructions, it has been discovered that the effectiveness of these holes 168 is greatly enhanced if structure is provided to insure that the area in front of these holes will be a uniform negative pressure area relative to the work area 44. To this end a restrictor plate 172 is coupled between air diffuser plate 43 and a filter shelf 170 used to hold supply filter 32 in place. Restrictor plate 172 is preferably held in place with a series of screws 174. The location of plate 172 may be altered by loosening screws 174 and sliding the plate inwardly or outwardly. By adjusting the location of plate 172 the balance between air flow down into the work area and air flow passing through the exhaust is maintained in favor of exhaust air. Plate 172 serves to even out any pressure differences in the area of holes 168 resulting from the competing air flows and the fact that the holes are interrupted with solid areas. This insures that air will flow into the holes and out the exhaust rather than out into the room in the area behind the sash. It is to be understood that holes 168 extend across the entire front of the cabinet to insure that the entire back side of the sash is effectively "sealed" against contaminate air entering the room.

As can be seen from the above, the invention provides a biological safety cabinet with a number of improved features and achieves a better air-flow into and through the cabinet. From the foregoing, it will be seen that this invention is one well adapted to attain all of the ends and objects herein above set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A biological safety cabinet, comprising:

a frame defining a protected work area, said work area being enclosed on all but a front face, said work area including a pair of spaced interior side walls;

a sash coupled to said frame, said sash at least partially enclosing the open front face of said work area;

a blower coupled to said frame generally above said work area, said blower being adapted to circulate air through said work area; and a sash grill coupled to said frame generally below said sash, said sash grill having a curved top surface, a plurality of first perforations through said top surface, and a plurality of second perforations through said top surface, said second perforations being *larger than said first perforations and being* located generally adjacent each of said side walls, said first and second perforations allowing air to flow through said sash grill, wherein the curved sash grill promotes smooth air flow into said work area, thereby better containing any harmful materials.

2. The biological safety cabinet of claim 1, the safety cabinet further comprising a pair of spaced side trim panels, one of said trim panels being located adjacent each of said side walls of said work area, said side trim panels forming an obtuse angle with respect to said side walls thereby promoting smooth flow of room air into said work area.

3. The biological safety cabinet of claim 1, wherein said sash has a handle coupled thereto along the lower-most surface thereof, said handle having a top surface adjacent said sash, a rear surface facing said work area and a front surface extending between the top and rear surfaces, said front surface of said handle being oriented at an acute angle relative to said rear surface to allow air entering said work area along said front surface to more smoothly interface with the air traveling downwardly along said rear surface.

4. The biological safety cabinet of claim 1, wherein said sash has a handle coupled thereto along the lower-most surface thereof, said handle having a top surface adjacent said sash, a rear surface facing said work area and a front angled surface extending between the top and rear surfaces, said angled front surface allowing air entering said work area along said front surface to more smoothly interface with the air traveling downwardly along said rear surface.

5. A biological safety cabinet, comprising:

a frame, said frame having outer walls and inner walls, said inner walls being spaced from said outer walls, said inner walls defining a protected work area, said work area being enclosed on all but a front face;

a sash coupled to said frame, said sash at least partially enclosing the front face of said work area;

a blower coupled to said frame generally above said work area, said blower being adapted to circulate air through said work area; and a pressure gauge mounted on one of said inner walls and located within said work area, said pressure gauge adapted to measure a positive pressure environment created by said blower above said work area, wherein any leaks in said pressure gauge will be contained within said work area.

6. The biological safety cabinet of claim 5, further comprising a supply filter forming a ceiling for said work area; said blower directing air through said supply filter, said supply filter being adapted to remove contaminants from the air flowing therethrough, and a plenum box located between said supply filter and said blower, said pressure gauge being adapted to measure the pressure within said plenum box.

7. The biological safety cabinet of claim 6, wherein one of said inner walls is a rear baffle plate defining the rear wall of said work area and wherein said pressure gauge is mounted in said baffle plate.

8. The biological safety cabinet of claim 7, wherein said sash is transparent, and wherein said pressure gauge is mounted at a location viewable through said sash.

9. A biological safety cabinet, comprising:

a frame defining a protected work area enclosed on all but a front face, said work area including a rear baffle, opposing side walls, a ceiling and a bottom surface, said baffle being spaced above said bottom surface;

a sash coupled to said frame, said sash at least partially enclosing the front face of said work area;

a blower coupled to said frame above said ceiling of said work area, said blower being adapted to circulate air through said work area;

a rear panel located behind said baffle of said work area, said rear panel spaced from said baffle to create a void through which air can flow; and a perforated towel catch extending between a lower-most edge of said baffle and said rear panel, said towel catch being closer to said bottom surface at said rear panel than at said baffle, wherein said towel catch may be visually inspected for blockage through said open front face of the safety cabinet.

10. The biological safety cabinet of claim 9, further comprising a removable work surface spaced above said bottom surface, said work surface concealing said towel catch from view when in place within said work area.

11. The biological safety cabinet of claim 10, wherein said towel catch is oriented at an acute angle with respect to said bottom surface.

12. The biological safety cabinet of claim 11, wherein said towel catch is removably coupled to said baffle.

13. The biological safety cabinet of claim 12, further comprising a pressure gauge coupled to said baffle, said pressure gauge adapted to measure a positive pressure environment created by said blower above said work area, wherein any leaks in said pressure gauge will be contained within said work area.

14. The biological safety cabinet of claim 10, further comprising a sash grill coupled to said frame generally below said sash, said sash grill having a curved top surface, wherein the curved sash grill promotes smooth air flow into said work area and containment of harmful materials.

15. A biological safety cabinet, comprising:

a frame defining a protected work area, said work area being enclosed on all but a front face;

a sash coupled to said frame, said sash at least partially enclosing the front face of said work area, said sash being moveable to allow access to said work area;

a blower coupled to said frame above said work area, said blower being adapted to circulate air through said work area;

a sash pocket coupled to the exterior of said frame generally above said work area and above said sash, said sash pocket being enclosed on all but a lower end thereof, said sash extending into said lower end of said sash pocket;

a front panel coupled to said frame above said work area and in front of said blower, said sash pocket being coupled to said front panel, said sash being spaced outwardly away from said front panel, and wherein said front panel includes a plurality of holes extending therethrough above said work area, said holes providing fluid communication between the exterior of the safety cabinet and the interior thereof, wherein said sash pocket provides a protective housing for said sash when said sash is moved upwardly away from said work area.

16. The biological safety cabinet of claim 15, wherein said sash is spaced away from said work area, allowing fluid communication between said work area and the exterior of the safety cabinet, the cabinet further comprising a deflector plate coupled to said frame at the upper end of said work area, said deflector plate extending towards said sash and being spaced away therefrom, said deflector plate operating to maintain a uniform negative pressure in the area of said holes thereby insuring a uniform flow of air into said holes.

17. The biological safety cabinet of claim 16, further comprising a front cover coupled to said frame, said cover extending over said sash pocket and said front panel to remove said sash pocket and said front panel from view.

18. A biological safety cabinet, comprising:

a frame defining a protected work area enclosed on all but a front face, said work area having a back wall, opposing side walls, a ceiling and a bottom surface;

a blower coupled to said frame above said ceiling of said work area, said blower being adapted to circulate air through said work area;

a supply filter forming said ceiling of said work area, said blower directing air through said supply filter, said supply filter being adapted to remove contaminants from the air flowing there through;

a plenum box located between said supply filter and said blower; and a distribution baffle located within said plenum box and extending generally across said plenum box, said distribution baffle being mounted with a first end located adjacent an output region of said blower and being angled upwardly as said baffle extends away from said blower, wherein said distribution baffle operates to evenly distribute the air flowing from said blower across said supply filter.

19. The biological safety cabinet of claim 18, further comprising a pair of curved deflector plates mounted within said plenum box, one of said deflector plates being mounted on each side of said box and oriented to direct air flowing within said box downwardly.

20. The biological safety cabinet of claim 18, further comprising an exhaust filter coupled to said frame above said plenum box, said exhaust filter being in fluid communication with the exterior of the cabinet and with the plenum box, said exhaust filter being adapted to remove contaminants from the air passing there through prior to being exhausted.

21. The biological safety cabinet of claim 20, further comprising an exhaust filter frame coupled to said frame and adapted to hold said exhaust filter, said exhaust filter frame having a sealing mechanism coupled thereto and coupled to said plenum box, said sealing mechanism including a threaded member mounted between said filter frame and said plenum box, said member being adapted to turn to move said frame upward and place an upward force on said exhaust filter while placing a downward force on said plenum box and said supply filter.

22. An exhaust control cap for a biological safety cabinet having an exhaust port, said control cap comprising:

an enclosure for said exhaust port, said enclosure having sides projecting above the top of said cabinet;

at least one side panel presenting a plurality of apertures therein;

a top panel extending over said sides and covering the top of said enclosure; and a plurality of plugs shaped to extend over a selected aperture, wherein said plugs may be placed over selected apertures to control the flow of air through the control cap, wherein air exhausted from said cabinet is directed outwardly through said apertures not covered with said plugs.

23. The exhaust control cap of claim 22, wherein said enclosure is generally rectangular and has four of said side panels, each having apertures therein.

24. The exhaust control cap of claim 23, wherein the apertures within the side panels are round and are varied in diameter.

25. An exhaust control cap for a biological safety cabinet having an exhaust port and an associated exhaust control system, said control cap comprising:

an enclosure for said exhaust port, said enclosure having sides projecting above the top of said cabinet, said enclosure being coupled with said exhaust control system;

an apertured plate coupled with said enclosure and intersecting the flow of air; and a plurality of plugs shaped to extend over a selected aperture within said apertured plate, wherein said plugs may be placed over selected apertures to control the flow of air through the control cap, wherein said apertured plate controls the flow of air exhausted from the cabinet and into said exhaust control system.

26. The exhaust control cap of claim 25, wherein the apertures within said apertured plate are round and are varied in diameter.

* * * * *